United States Patent [19]

Bingham et al.

[11] Patent Number: 5,446,823
[45] Date of Patent: Aug. 29, 1995

[54] AERIAL, PEDESTAL, BELOW GRADE, OR BURIED OPTICAL FIBER CLOSURE

[75] Inventors: Gail J. Bingham, Menlo Park; Jeff Haller, San Francisco; Mathew Steinberg, Santa Clara, all of Calif.

[73] Assignee: Raychem Corporation, Menlo Park, Calif.

[21] Appl. No.: 187,585

[22] Filed: Jan. 26, 1994

[51] Int. Cl.6 .................................................. G02B 6/00
[52] U.S. Cl. ............................................ 385/135; 385/137; 385/134; 385/136; 248/215; 174/93; 428/36.9
[58] Field of Search ............... 385/135, 134, 136, 137; 248/215; 174/87, 92, 93; 428/35.1, 36.9

[56] References Cited

U.S. PATENT DOCUMENTS

| | | | |
|---|---|---|---|
| 4,117,259 | 9/1978 | Giebel et al. | 174/92 |
| 4,421,945 | 12/1983 | Moisson | 174/92 |
| 4,538,021 | 8/1985 | Williamson | 174/92 |
| 4,549,040 | 10/1985 | Goetter | 174/92 |
| 4,692,564 | 9/1987 | Campbell | 174/92 |
| 4,692,565 | 9/1987 | Koht et al. | 174/93 |
| 4,831,215 | 5/1989 | Clark et al. | 174/92 |
| 4,839,472 | 6/1989 | Pichler | 174/92 |
| 4,861,946 | 8/1989 | Pichler et al. | 174/92 |
| 4,865,890 | 9/1989 | Erlichman | 428/35.1 |
| 4,865,893 | 9/1989 | Kunze | 428/36.9 |
| 4,902,856 | 2/1990 | Miller | 174/91 |
| 4,914,261 | 4/1990 | Tokumaru et al. | 174/92 |
| 4,924,034 | 5/1990 | Truesdale | 174/87 |
| 5,006,669 | 4/1991 | Bachel et al. | 174/93 |
| 5,030,798 | 7/1991 | Schilling | 174/92 |
| 5,097,529 | 3/1992 | Cobb et al. | 385/135 |
| 5,113,038 | 5/1992 | Dehling | 174/92 |
| 5,155,794 | 10/1992 | Nolf et al. | 385/135 |
| 5,185,845 | 2/1993 | Jones | 385/135 |
| 5,218,664 | 6/1993 | O'Neill et al. | 385/135 |
| 5,249,253 | 9/1993 | Franckx et al. | 385/135 |

FOREIGN PATENT DOCUMENTS

| | | |
|---|---|---|
| 3739714C | 2/1989 | Germany . |
| 2193605 | 2/1988 | United Kingdom . |
| WO90/05401 | 5/1990 | WIPO . |
| WO92/05609 | 4/1992 | WIPO . |
| WO92/22113 | 12/1992 | WIPO . |

OTHER PUBLICATIONS

Brochure Preformed Line Products 1993 no month.
Brochure Preformed Line Products 1992 no month.

*Primary Examiner*—Frank Gonzalez
*Assistant Examiner*—Phan T. H. Palmer
*Attorney, Agent, or Firm*—Herbert G. Burkard; A. Stephen Zavell

[57] ABSTRACT

A universal end seal for a butt splice or in-line optical fiber closure is described. The seal includes a keyed tubular member to permit initial assembly but re-entry and use without dis-assembling the complete end seal. A hanger for an in-line closure is also described.

16 Claims, 5 Drawing Sheets

AERIAL, PEDESTAL, BELOW GRADE, OR BURIED OPTICAL FIBER CLOSURE

TECHNICAL FIELD OF THE INVENTION

The invention relates to optical fiber closures. More specifically, the invention relates to optical fiber closures for aerial, pedestal, below grade, or buried applications which permit reentry without the need to make a complete reassembly of the end seal or seals of the enclosure with the addition of extra branch out cables.

BACKGROUND OF THE INVENTION

Whenever a cable whether for an in line splice or a butt splice needs to be opened up to access the internal optical fibers, sealing of the cable is a difficult and necessary operation. Often times a smaller drop optical fiber cable will need to be spliced into the trunk optical fiber cable in an enclosure which must be large enough to provide room for the splicing of the fiber, organizing loose fiber and protecting associated electronics where applicable. Sealing such an ,enclosure becomes difficult as the size of the enclosure increases. An in line enclosure presents additional complications because there are at least two end seals instead of the one end seal in a butt splice closure, as well as perhaps one or more long longitudinal seams running between the end seals.

Thus, it would be highly desirable to have an end seal which is adaptable to be used in either a butt splice or an in-line enclosure where reentry is often necessary. In addition, it would be highly desirable to have an end seal that, once assembled, permits the addition of drop cables to be added to the closure without the need to reconstruct the end seal or to require room to drill an additional aperture which may damage the enclosure electronics or optical fibers. Additionally, it is desirable to have a closure that does not require special and expensive tools. Finally, it would be highly desirable to have an end seal which can be effectively utilized to form a butt splice or in line closure where the seal can be formed in the absence of elevated temperatures as are often used with heat shrinkable sealing materials. A further desirable feature would be the ability to mount the in-line closure either aerially or in an underground vault with a hanging member which can be adapted to grounding if necessary as well as adaptable for use with either the aerial support wire or the underground pipe hanger.

SUMMARY OF THE INVENTION

The above desirable features and many others obvious to the ordinary skilled artisan are achieved by various embodiments of the present invention. More specifically, an embodiment of the invention is an end seal which permits reentry and later addition of additional drop optical fiber cables without the need to reconstruct the entire end seal and where the end seal finds use in either a butt splice or in-line closure. In a different embodiment of the invention where it is often desirable to mount the butt or the in-line enclosure either aerially or in a vault, an attachment clip is provided which is adaptable to both buried and vault applications with or without the need for grounding which eliminates the specificity of the enclosure and permits its application in either environment.

BRIEF DESCRIPTION OF THE DRAWING(S)

DESCRIPTION OF THE PREFERRED EMBODIMENTS

Figure 1:
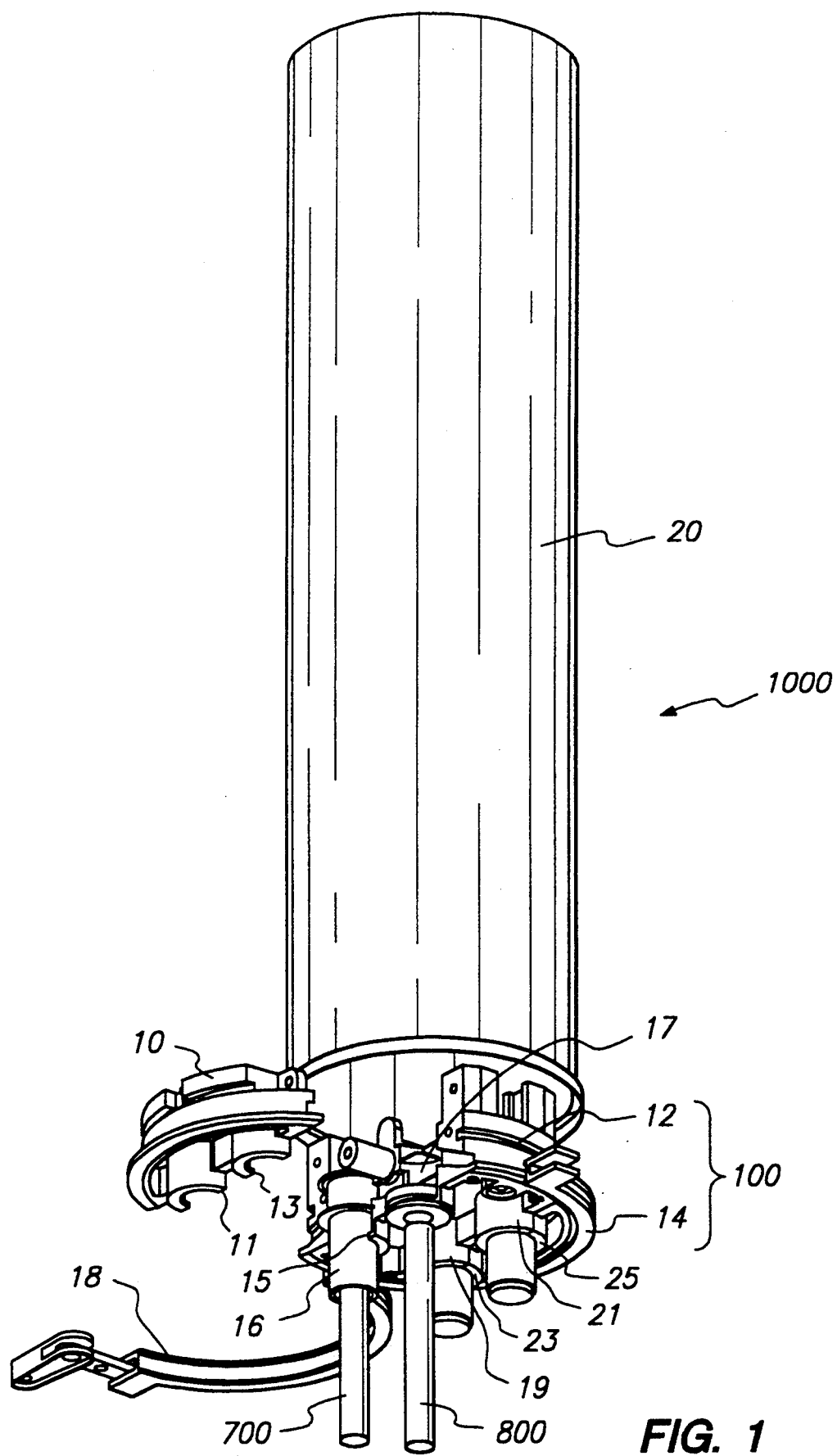
FIG. 1 illustrates an optical fiber butt splice closure of the present invention.

The invention will be more particularly described with reference to the preferred embodiments illustrated in the figures. More specifically, FIG. 1 illustrates a butt splice enclosure 1000. The enclosure 1000 includes a flanged seal 100 which comprises, in this embodiment, three main flanged sections 10, 12 and 14 wherein adjacent sections namely 10 and 12 and 12 and 14 have interior located semicircular members 11, 13; 15, 17; 19, 21; and 23-25 respectively, to form cable passages upon assembly of the end seal 100. As a butt splice closure, the end seal 100 also includes the closed end tubular member, i.e. dome 20, a clamp 18 or other suitable sealing device such as a heat shrinkable plastic sleeve, and the like. The end seal 100 is preferably made of glass filled polypropylene or other structural engineering plastic. A suitable glass content is between about 5% to 20%. Members 16 or cables 700 and 800 fit within the so formed passage.

Figure 2:
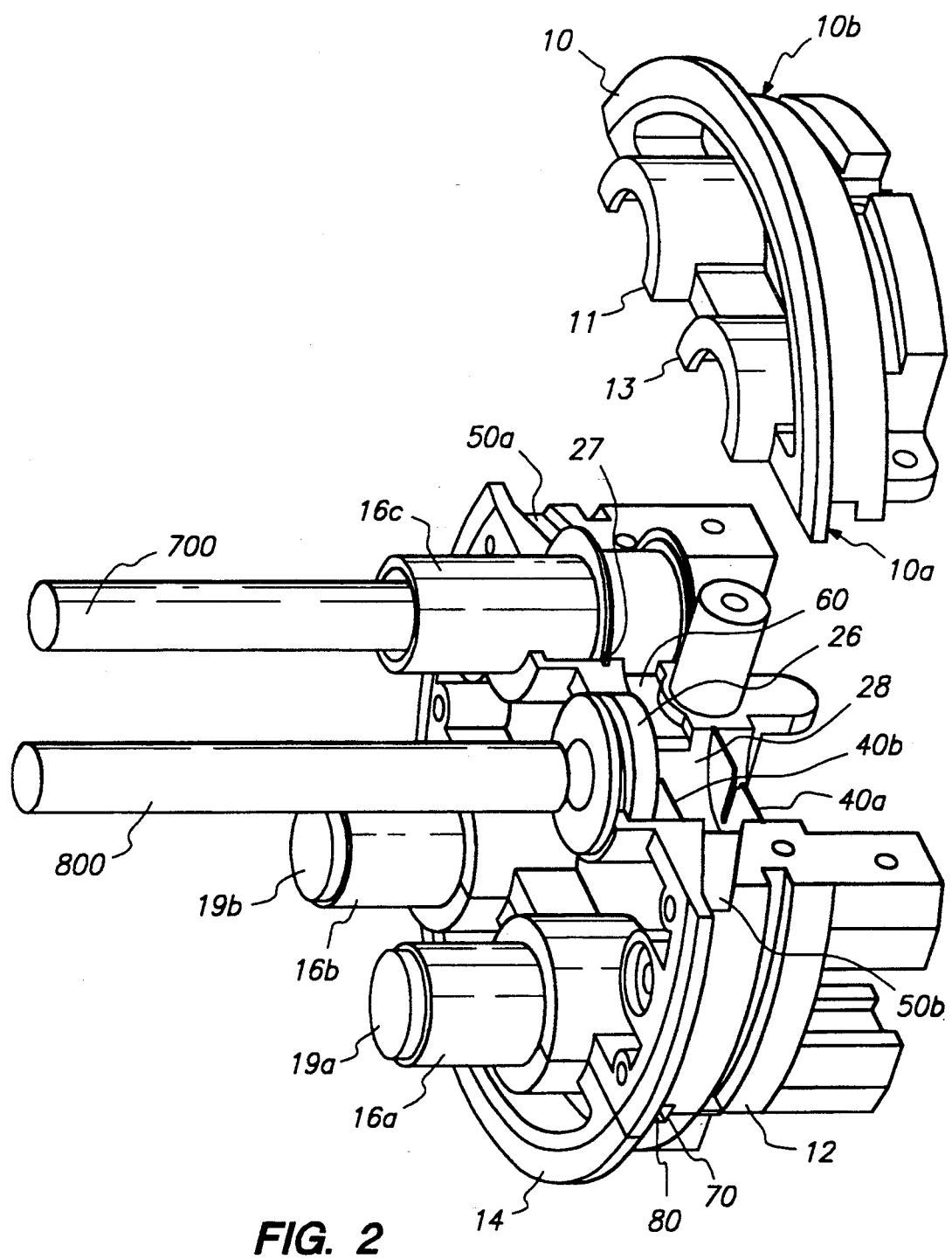
FIG. 2 illustrates an exploded view of the end seal in the closure of FIG. 1 and FIG. 3.

More specifically as illustrated, in FIG. 2, each flanged section 10, 12 and 14 has an outer peripheral section which forms the outer section of the end seal and an inner portion having portions which mate together with adjacent portions to form the tubular path through the end seal. The flanged sections 10, 12 and 14 each have edges such as 10a and 10b which provide either an end step when two end seals are used in an in-line closure or the base half of an end seal with a butt splice cover (FIG. 1). Thus, the design provides a universal in-line and/or butt splice end seal without the need for additional parts to convert from one form to another or the extra leak paths introduced by the added parts in the conversion. Each tubular member includes a keyed closed end member 16 or more specifically before opening illustrated as 16a and 16b with members closed end members 19a and 19b, respectively. Thus, the end seal can seal a larger diameter cable illustrated as 800 directly in the passthrough or a smaller cable or a later added cable through member 16. The "I" beam like cross-section of the individual sections adds stiffness and lightness. By "I" beam cross-section it is meant a thicker edge portion joined by vertical wall sections. The cross-section is viewed perpendicularly and rotated by 90° to the splits of the sections across the end piece.

In reference to FIG. 2 the end seal is illustrated with the keying member 27 which precludes the tubular member 16c from rotating in the pass through formed between 11 and 15. When the end seal is later reentered to, for example, insert cable 700, a suitable sealing closure such as is described in U.S. Ser. No. 08/097,333 filed Jul. 23, 1993 pending and completely incorporated herein by reference for all purposes may be utilized to seal cable 700 within member 16c or a product under the tradename EZAM ™ by Raychem Corporation or other suitable cable sealing devices. Neither of these cable seals are illustrated for purposes of describing the segmented end seal 100. If either cable 700 or 800 are too small to fit the end seal or tubular member, the cables may be built-up with a suitable mastic or rubber tape. However, a Raychem nitrile based mastic with a firm backing of a polypropylene or like non-porous but flexible strip is preferred because it limits the movement of the mastic. An alternative preferred tape is a Raychem butyl mastic S 1278 with a silimar backing.

In particular, the embodiments shown in greater detail in FIG. 2 include a section 28 bounded by split fingers 40a and 40b which retain a suitable sealing material, such as a mastic, to seal the cable in the end seal. An example is Raychem butyl mastic S 1278 or a nitrile rubber based mastic but any other suitable sealing mastic used in the telecommunications cable sealing applications can be employed. It is preferred to not mix different types of mastics in the same end seal. Alternatively a silicon or Kraton ® based gel can be used as taught in U.S. Pat. No. 5,140,746 or U.S. Ser. No. 07/304,431, still pending both of said documents are completely incorporated herein by reference. Although two fingers are described any number are applicable and they should be angled outwardly away from a common base to assist in reducing installation forces. Alternatively, the fingers could be replaced by other members, for example, a semi-circular flange.

The end seal further includes channels or grooves 50a and 50b and 65 which provide areas of expansion for the sealant placed in, for example, the channel 28 to permit its expansion upon compression of end seal members 10 and 12 around the cable or the closed end port 16a, 16b and 16c to provide a continuous sealing path across the interface of members 10 and 12. In a like manner segments 10 and 14 and the side of segment 12 not shown contain similar channels to seal across the segments of the end seal. Several of the channels between segments 12 and 14 are illustrated as 70 and 80 in FIG. 2. Although the preferred three component end seal 100 having four passages was described, it should be clear that the end seal can comprise two semi-circular member with two passages or a four member end seal with six passages etc.

The non-rotatable keyed structure of the closed port 16c illustrated as member or a notch on the periphery of closed end member 16c prevents member 16c and for that matter member 16a and 16b from rotating within the pass through seal which might have the effect of breaking the seal and providing a leak path. Grommet 26 provides a centering and blocking means for excess sealant which may exude through the fingers 40b for a larger size cable initially sealed within an end seal. Upon later reentry and the need to add an additional cable, for example, cable 700 the cap member portion 19a of the closed tubular member is removed to provide access to the central portion of the closure without disturbing the completed end seal 100. Of course cable 700 is sealed to and within member 16c. This is a major improvement no redrilling or breaking of the overall end seal is required to add cables at a future time.

Figure 3:
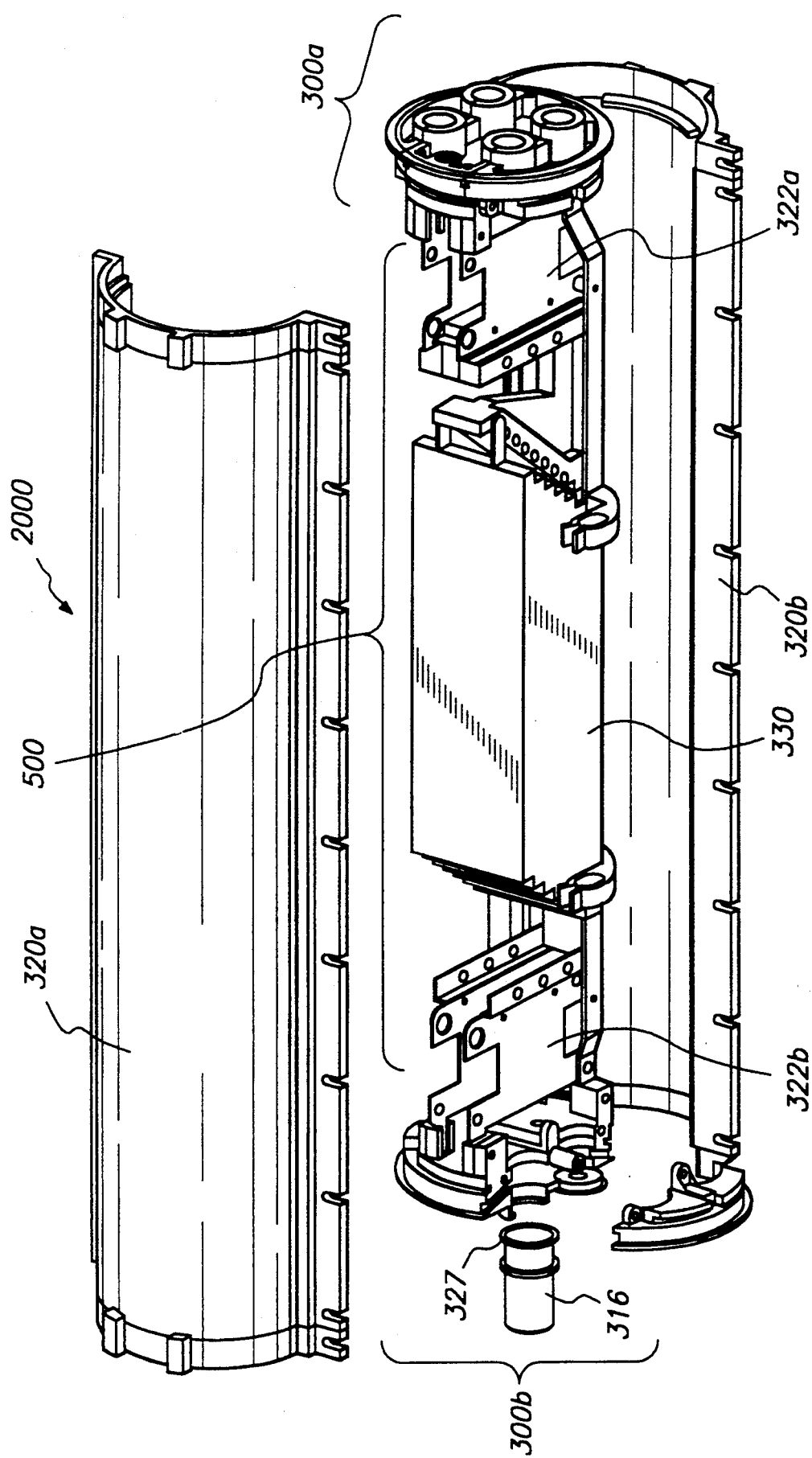
FIG. 3 illustrates an in line optical fiber enclosure having opposing end seals and opposing body half portions to form the closure therebetween.

FIG. 3 illustrates an in line embodiment of the invention having two end seals 300a and 300b with optical fiber holding members 322a and 322b attached to respective end seals and containing and holding at least one or a plurality of optical fiber tray illustrated as the stair stepped element 330. For any end seals where cables will not be initially installed a closed end keyed tubular member 316 similar to tubular member 16 described previously having keying member 27 similar to keying member 327 described before is inserted into any of the open ports upon assembly of the end seal and thereafter the outer members 320a and 320b sealed to the end seals 300a and 300b and along opposing peripheral seams by compressing a rubber grommet or other suitable sealing means, for example, a U-shaped metal bar bolting the longitudinal edges of the in-line enclosure together.

Figure 4:
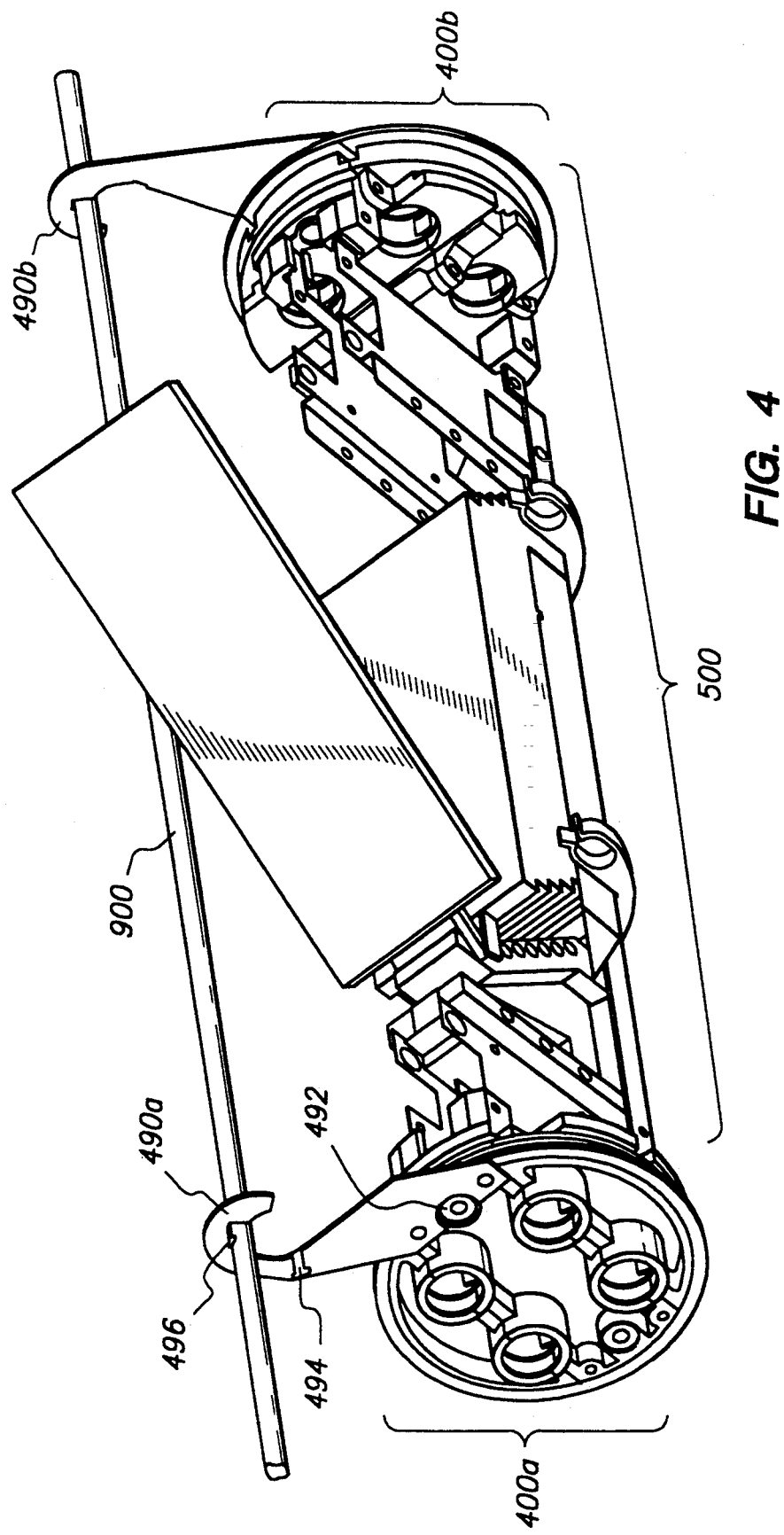
FIG. 4 illustrates the in line splice enclosure embodiment containing closure hangers adapted to an aerial support member.

FIG. 4 illustrates the in line closure 500 having end seal units 400a and 400b disposed on an aerial support wire making it capable for use as an aerial optical fiber closure. The hanger members 490a and 490b are mechanically affixed to the center members of the end seals 400a and 400b with bolts or screws or other suitable affixing means such as adhesives and the like. This preferred mounting location avoids the closure's hang weight from potentially separating the end seal that an end mounting might create. The hook shaped hanger members can be oriented in opposite directions as illustrated to prevent swinging of the closure or in the same direction if it merely is to be hooked directly on the wire. The hanger members contain tabs 492, 494, and 496 through which the interior of the enclosure at member 492 can create a ground which is subsequently adjoined to the aerial strand with a bolt or clamp at tab 496. The hangers 490a and 490b are preferably stamped from a sheet of metal and the tabs later bent out where appropriate. For example, if the closure is intended not to be grounded, tab 492 can be bent perpendicular to the hanger or broken off. Likewise, an advantageously feature of bending tab 496 upwards, as illustrated is to form a substantial perpendicular to the hanger member body 490a or 490b to create a detent in the hanger member which helps locate the hanger 490a or 490b on the wire strand while providing a metal tab through to ground the closure to the wire strand.

Figure 5:
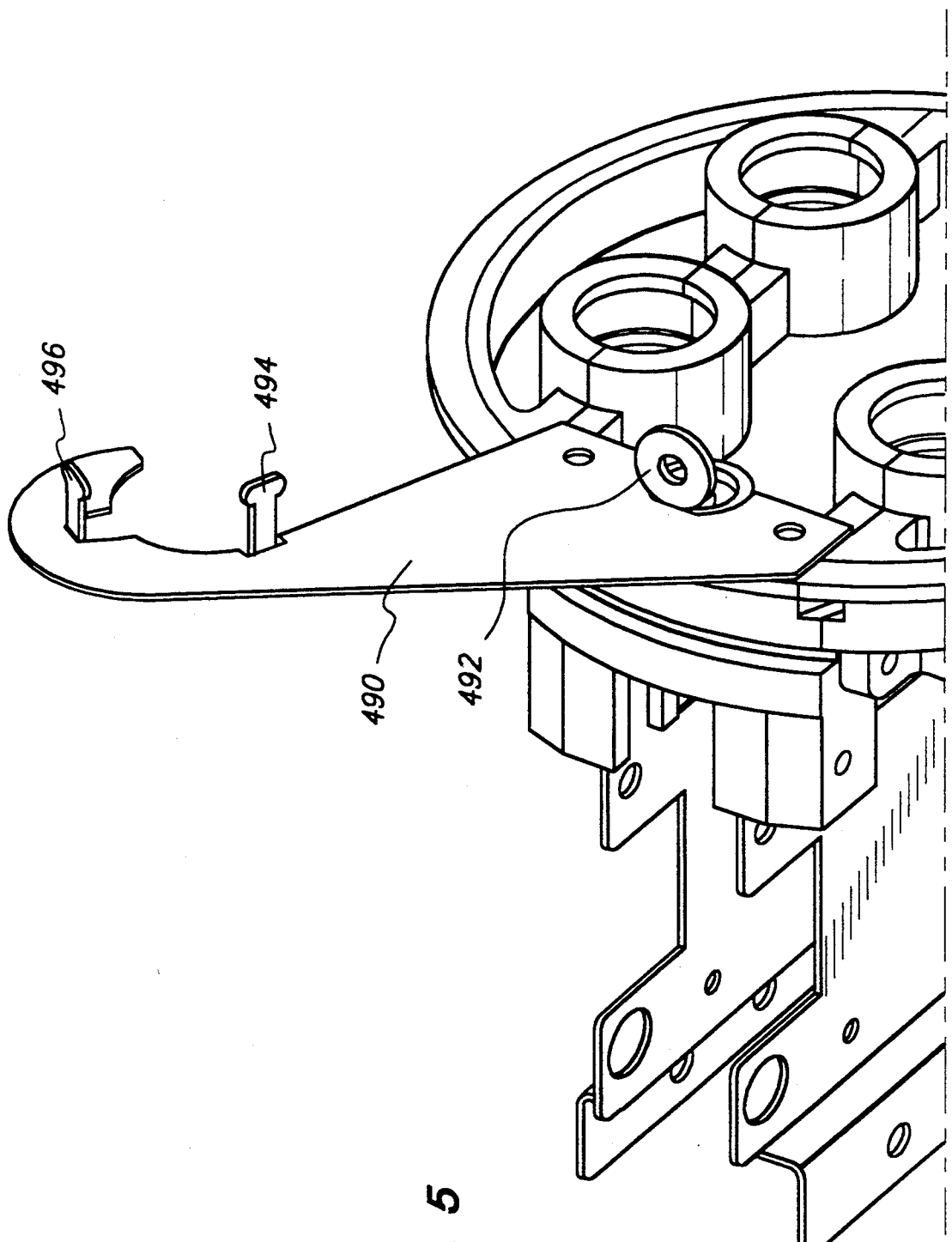
FIG. 5 illustrates a magnified view of the hanger in FIG. 4.

The hanger is more particularly illustrated in FIG. 5 where the hanger 490 has both tabs 494 and 496 bent substantially perpendicular to the body and now providing a wider hanger member to be used in a vault or other similar application. Also illustrated in FIG. 5 is tab member 492 bent away from the body 490 such that in this embodiment the closure would not be grounded to the hanger pipe in the vault; of course, 492 can be bent downward to contact the end seal and electrically bolted there to create the grounding path through the hanger member 490.

The invention has been described with respect to a particularly preferred embodiments. Modifications which would be obvious to one of ordinary skilled in the art are contemplated to be within the scope of the invention.

What is claimed is:

1. A flanged segmented end seal for a telecommunications closure comprising a plurality of flanged segments which when joined together create an outer periphery and adjacent interior portions of the flanged segments have opening portions such that when fitted together the flanged segmented end seal provides at least two tubular pass through openings for optical fiber cables.

2. The end seal according to claim 1 further including a second flanged segmented end seal spaced apart from the first end seal and two longitudinal C shaped half shells fitting together between the spaced apart end seals to form an in-line enclosure.

3. The end seal according to claim 2 further including two hanger members on opposite outside ends of the first and second end seals, each of said hanger members comprising a hook shaped body member having a wider base section away from the curve of the hook, apertures located in the wider base section for affixing to a telecommunications closure, a tab member positioned along the base to provide for a grounding point, said tab member capable of being broken off and removed if no grounding is desired, and tab members substantially adjacent to the interior curved portion of the hook where one of the tab members can be bent at an angle away from the plane of the hanger to provide an additional detent in the hanger for grounding and grabbing of wire strand while the other tab member when bent away from the base provides a wider radius of curvature for the hook portion to provide locating and ground of the hanger member to a second larger body.

4. The end seal according to claim 3 wherein the hangers are mounted to the first and second end seals with the hook shaped portions facing opposite directions.

5. The end seal according to claim 2 further including a plurality of stair stacked optical fiber trays.

6. The end seal according to claim 3 wherein the hanger members orient the end seals such that an upward movement of at least one hinged optical fiber tray is not restricted by the wire mounting strand or bar to which the end seals are attached.

7. The segmented end seal according to claim 1 wherein each segment has a channel running along the substantially flat base portion(s) of the segment creating a sealant expansion groove along and between the tubular pass through openings to form a continuous seal across the segments upon the formation of the end seal.

8. The end seal according to claim 7 wherein the end seal is circular when assembled.

9. The end seal according to claim 8 wherein the segments forming the end seal are fabricated from a glass filled polypropylene.

10. The end seal according to claim 9 wherein the polypropylene is about 5% to 20% glass filled polypropylene.

11. The segmented end seal according to claim 1 further including a closed end member capable of sealing to the end seal to create a butt splice enclosure.

12. The end seal according to claim 11 further including a clamp to seal the closed end member to the end seal.

13. The end seal according to claim 1 wherein the tubular pass through openings formed within the end seal are blocked with a keyed closed end tubular member until used, the keyed portion of the tubular member resists the rotation of the closed end tubular member in the pass through opening.

14. The end seal according to claim 13 wherein the keyed closed end tubular member is heat shrinkable at the closed end to seal to a cable upon the removal of the closed end.

15. The end seal according to claim 13 wherein the keyed portion is a tabbed finger flange.

16. The end seal according to claim 13 wherein the closed end of the closed end tubular member is removed and a cable is sealed therein.

* * * * *